United States Patent
Choi et al.

(10) Patent No.: US 12,041,122 B2
(45) Date of Patent: Jul. 16, 2024

(54) APPARATUS AND METHOD FOR AUTOSCALING SERVICE SHARED IN CLOUD

(71) Applicant: ELECTRONICS AND TELECOMMUNICATIONS RESEARCH INSTITUTE, Daejeon (KR)

(72) Inventors: Hyun-Hwa Choi, Daejeon (KR); Dae-Won Kim, Daejeon (KR); Sun-Wook Kim, Hwaseong-si (KR); Su-Min Jang, Sejong-si (KR); Jae-Geun Cha, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 31 days.

(21) Appl. No.: 17/686,457

(22) Filed: Mar. 4, 2022

(65) Prior Publication Data

US 2022/0286499 A1 Sep. 8, 2022

(30) Foreign Application Priority Data

Mar. 4, 2021 (KR) .................. 10-2021-0028884
Mar. 2, 2022 (KR) .................. 10-2022-0026669

(51) Int. Cl.
*G06F 15/173* (2006.01)
*H04L 67/1008* (2022.01)
(Continued)

(52) U.S. Cl.
CPC ...... *H04L 67/1008* (2013.01); *H04L 67/1014* (2013.01); *H04L 67/1036* (2013.01); *H04L 67/51* (2022.05)

(58) Field of Classification Search
CPC . H04L 67/1008; H04L 67/51; H04L 67/1014; H04L 67/1036
(Continued)

(56) References Cited

U.S. PATENT DOCUMENTS

| 11,121,943 B2* | 9/2021 | Eberlein ............ H04L 41/5054 |
| 2016/0191343 A1* | 6/2016 | Dong ................. G06F 9/5083 |
| | | 709/226 |

(Continued)

FOREIGN PATENT DOCUMENTS

| KR | 10-2015-0062634 A | 6/2015 |
| KR | 10-2016-0073892 A | 6/2016 |
| KR | 10-2019-0076693 A | 7/2019 |

*Primary Examiner* — Duyen M Doan
(74) *Attorney, Agent, or Firm* — LRK PATENT LAW FIRM

(57) ABSTRACT

Disclosed herein are an apparatus and method for autoscaling a service shared in a cloud. The apparatus may include memory in which at least one program is recorded and a processor for executing the program, and the program may perform autoscaling by which at least one second service for performing the same function as a first service is additionally generated or deleted depending on a load that is incurred when multiple clients call the first service in the cloud. The at least one second service may be set to one of two or more execution types having different response times depending on a response time required by each of the multiple clients.

7 Claims, 7 Drawing Sheets

(51) Int. Cl.
*H04L 67/1014* (2022.01)
*H04L 67/1036* (2022.01)
*H04L 67/51* (2022.01)

(58) Field of Classification Search
USPC .................................................. 709/223–226
See application file for complete search history.

(56) References Cited

U.S. PATENT DOCUMENTS

| | | |
|---|---|---|
| 2018/0039516 A1 | 2/2018 | Biran et al. |
| 2019/0123970 A1* | 4/2019 | Rastogi ................... H04L 41/40 |
| 2019/0347139 A1* | 11/2019 | Géhberger ............ G06F 9/5083 |
| 2019/0370080 A1* | 12/2019 | Patel ................... H04L 43/0876 |
| 2020/0326983 A1 | 10/2020 | Chen et al. |
| 2022/0164186 A1* | 5/2022 | Pamidala .............. G06F 9/5088 |

* cited by examiner

APPARATUS AND METHOD FOR AUTOSCALING SERVICE SHARED IN CLOUD

CROSS REFERENCE TO RELATED APPLICATIONS

This application claims the benefit of Korean Patent Application Nos. 10-2021-0028884, filed Mar. 4, 2021, and 10-2022-0026669, filed Mar. 2, 2022, which are hereby incorporated by reference in their entireties into this application.

BACKGROUND OF THE INVENTION

1. Technical Field

The disclosed embodiment relates to technology for autoscaling a service shared in a cloud.

2. Description of Related Art

Since Infrastructure-as-a-Service (IaaS), which provides infrastructure resources, such as servers, storage, and networks, in the form of services that are made available according to need, was first introduced, cloud services that have expanded in the form of Platform-as-a-Service (PaaS), Software-as-a-Service (SaaS), and Function-as-a-service (FaaS) are being provided.

Here, PaaS is a form of service that provides not only a stable platform on which a service can be developed, but also APIs through which applications using the platform can be developed, SaaS provides an application running in a cloud environment in the form of a service, and FaaS is a service for a stateless application based on events.

IaaS, PaaS, and SaaS are continuously run by allocation of cloud resources thereto. On the other hand, FaaS is allocated resources each time an event occurs, and returns the resources after an application is executed once. Therefore, FaaS has advantages in terms of resources and cost.

Meanwhile, a cloud service is provided along with an autoscaling function for the purpose of provision of flexibility in infrastructure management and availability of infrastructure, whereby the cloud service may flexibly respond to a suddenly incurred load. Particularly, through interworking with a load balancer, stable service and efficient use of resources may be supported by increasing or decreasing the number of servers as needed. However, autoscaling is limitedly applied only to IaaS, PaaS, and SaaS, and FaaS is not included as a target of autoscaling because it is automatically scaled out depending on the frequency of event occurrences.

However, currently provided autoscaling of a cloud service is configured to provide only the same quality of service based on a service request load.

Recently, in order to quickly respond to a rapid increase or decrease in service load, a lot of services have been converted into microservices, and the development of edge services is actively underway based on the emergence of various terminal devices and on the advancement of network technology including 5G. These changes result in an increase in the number of cloud services shared between a large number of services (applications).

However, in the situation in which services are diversified, more than just the same quality of cloud services is required. That is, what is required is a method for supporting efficient use of resources while responding to a service load by autoscaling a service so as to allow different response times (latencies).

SUMMARY OF THE INVENTION

An object of the disclosed embodiment is to scale out services so as to allow different execution types in a method for automatically scaling shared services used by multiple services (applications), thereby supporting various services while efficiently using resources.

An apparatus for autoscaling a service according to an embodiment includes memory in which at least one program is recorded and a processor for executing the program. The program may balance the load of a cloud system by scaling a service requested from the cloud system by multiple clients based on set scaling information.

Here, the set scaling information may include service specifications, scaling metric information, resource information, and service map information.

Here, the service specifications may include the name of the service, information about resources required for execution of the service, and quality information including latency.

Here, the service map information may include IP address information pertaining to any one of the clients and information about the type of the latency.

Here, the resource information may include information about the amount of hardware usage.

An apparatus for autoscaling a service according to an embodiment includes memory in which at least one program is recorded and a processor for executing the program. The program may perform autoscaling by which at least one second service for performing the same function as a first service is additionally generated or deleted depending on a load incurred when multiple clients call the first service in the cloud, and the at least one second service may be set to one of two or more execution types having different response times depending on a response time required by each of the multiple clients.

Here, an execution type of the second service may include an application type having the same response time as the first service and a function type having a response time longer than a response time of the first service.

Here, the program may register information about execution of the additionally generated or deleted second service and client information, including the required response time, in a load balancer, and the load balancer may deliver a request from a client for which it is determined that a response time required thereby is longer than the response time of the first service to the second service of the function type.

Here, the first service may be executed in a first service instance based on a container, and the second service may be executed in a second service instance based on a container. When the execution type of the second service is the function type, container configuration information of the first service instance may be different from container configuration information of the second service instance.

Here, the program may perform service scale-out depending on whether a monitored resource value of the first service is equal to or greater than a maximum value set in scaling metric information, and may perform additionally generating a second service instance of a function type or an application type depending on whether the number of clients for which it is determined that a response time required thereby is longer than the response time of the first service is equal to or greater than a value acquired by dividing the total number of clients by the total number of service instances generated previously.

Here, the program may further perform checking the number of second service instances and an execution type of each of the second service instances based on monitored resource values; and checking whether the number of second service instances is equal to or greater than the maximum number of replicas defined in scaling metrics, and additionally generating the second service instance may be performed only when the number of second service instances is less than the maximum number of replicas defined in the scaling metrics.

Here, the program may further perform determining whether the second service instance of the function type is running, and additionally generating the second service instance may be configured to additionally generate the second service instance of the application type when the second service instance of the function type is running.

Here, the program may further perform determining whether a definition of the second service of the function type is present, and additionally generating the second service instance may be configured to generate the second service instance of the application type when the definition of the second service of the function type is not present.

Here, the program may perform service scale-in depending on whether a monitored resource value of the first service is equal to or less than a minimum value set in scaling metric information, and may perform, depending on whether the number of requests for the second service of the function type is equal to or greater than the minimum number of requests for the function type defined in scaling metrics, stopping a second service instance of the function type or application type that is running.

Here, the program may further perform checking the number of second service instances and an execution type of each of the second service instances based on monitored resource values; and checking whether the number of second service instances is equal to the minimum number of replicas defined in the scaling metrics, and stopping the second service instance may be performed only when the number of second service instances is greater than the minimum number of replicas defined in the scaling metrics.

Here, the program may further perform determining whether the second service instance of the function type is running, and stopping the second service instance may be configured to stop the second service instance of the application type when the second service instance of the function type is not running.

A method for autoscaling a service, in which at least one second service for performing the same function as a first service is additionally generated or deleted depending on a load incurred when multiple clients call the first service in a cloud, according to an embodiment may include additionally generating or deleting the second service corresponding to one of two or more execution types, which is selected depending on a response time required by each of the multiple clients; and registering information about execution of the additionally generated or deleted second service and client information, including the required response time, in a load balancer.

Here, an execution type of the second service may include an application type having the same response time as the first service and a function type having a response time longer than a response time of the first service.

Here, the first service may be executed in a first service instance based on a container, and the second service may be executed in a second service instance based on a container. When the execution type of the second service is the function type, container configuration information of the first service instance may be different from container configuration information of the second service instance.

Here, additionally generating or deleting the second service may include determining service scale-out depending on whether a monitored resource value of the first service is equal to or greater than a maximum value set in scaling metric information; and when the service scale-out is determined, additionally generating a second service instance of a function type or an application type depending on whether the number of clients for which it is determined that a response time required thereby is longer than the response time of the first service is equal to or greater than a value acquired by dividing the total number of clients by the total number of service instances generated previously.

Here, additionally generating or deleting the second service may further include, when the service scale-out is determined, checking the number of second service instances and an execution type of each of the second service instances based on monitored resource values; and checking whether the number of second service instances is equal to or greater than the maximum number of replicas defined in scaling metrics, and additionally generating the second service instance may be performed only when the number of second service instances is less than the maximum number of replicas defined in the scaling metrics.

Here, additionally generating the second service instance may include determining whether the second service instance of the function type is running; and determining whether a definition of the second service of the function type is present. When the second service instance of the function type is running or when the definition of the second service of the function type is not present, the second service instance of the application type may be additionally generated.

Here, additionally generating or deleting the second service may include determining service scale-in depending on whether a monitored resource value of the first service is equal to or less than a minimum value set in scaling metric information; and when the service scale-in is determined, stopping, depending on whether the number of requests for the second service of the function type is equal to or greater than the minimum number of requests for the function type defined in scaling metrics, a second service instance of the function type or application type that is running.

Here, the method may further include checking the number of second service instances and an execution type of each of the second service instances based on monitored resource values; and checking whether the number of second service instances is equal to the minimum number of replicas defined in the scaling metrics, and stopping the second service instances may be performed only when the number of second service instances is greater than the minimum number of replicas defined in the scaling metrics.

A load balancer device according to an embodiment may include memory in which at least one program is recorded and a processor for executing the program. Depending on a load incurred when multiple clients call a first service in a cloud, the program may deliver calls from the clients to at least one second service for performing the same function as the first service. The program may perform registering or deleting information about execution of the second service, which performs the same function as the first service, and client information, including a required response time, in response to a request from an autoscaler; and delivering a request from a client for which it determined that a response time required thereby is longer than a response time of the first service to a second service of a function type, and the at least one second service may be one of two or more execution types having different response times.

A method for autoscaling a service according to an embodiment may balance the load of a cloud system by scaling a service requested from the cloud system by multiple clients based on set scaling information.

Here, the set scaling information may include service specifications, scaling metric information, resource information, and service map information.

Here, the service specifications may include the name of the service, information about resources required for execution of the service, and quality information including latency.

Here, the service map information may include IP address information pertaining to any one of the clients and information about the type of the latency.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
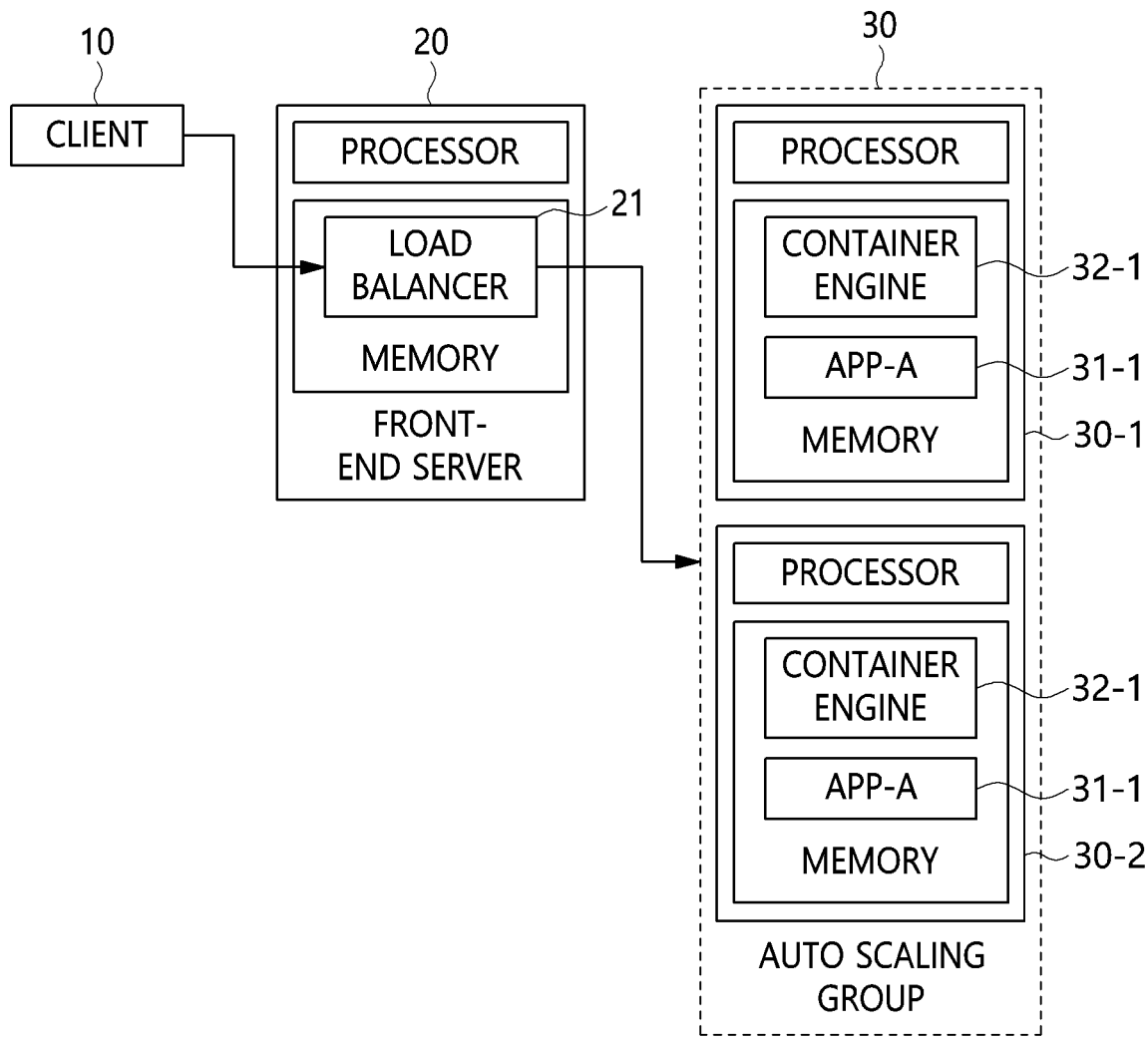
FIG. 1 is an exemplary view illustrating general autoscaling of a service shared in a cloud.

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, an apparatus and method for autoscaling a shared service according to an embodiment will be described in detail with reference to FIGS. 1 to 7.

FIG. 1 is an exemplary view illustrating general autoscaling of a service shared in a cloud.

Referring to FIG. 1, a client 10 may be an application that calls App-A 31-1, which is a shared service run in a cloud.

Here, the client 10 may be executed outside the cloud in which App-A 31-1 is executed, or may be executed in the same cloud as App-A 31-1.

Here, the client 10 may comprise multiple clients. Here, the multiple clients 10 may be multiple processes of the same application or different types of programs run in different application environments. That is, App-A 31-1 may be shared between the multiple clients 10.

Meanwhile, App-A 31 may be executed in an instance 30-1 based on a container 32-1. However, when the number of clients 10 that share App-A 31-1 therebetween or the number of requests for App-A 31-1 from the client 10 increases, the load imposed due to execution of App-A 31-1 is increased. Accordingly, an instance 30-2 of App-A is generated based on a new container to which container settings, such as the types and the number of processors (a CPU, a GPU, and the like), the memory size, the network, and the executable image of the container-based instance 30-1, are copied without change, whereby the load of App-A 31-1 may be dispersed.

Here, requests from the client 10 to call App-A may be distributed by a load balancer 21. That is, the load balancer 21 may distribute the requests from the client 10 to the multiple instances 30-1 and 30-2 for execution of service App-A based on any of various algorithms, such as a round-robin, an IP hash method, and the like.

On the other hand, autoscaling may decrease the number of service execution instances by deleting a container when the load of App-A is small.

Meanwhile, in order to quickly respond to a rapid increase or decrease in the load of a service, many services have recently been converted into microservices, and the development of edge services is actively underway based on the emergence of various types of terminal devices and on the advancement of network technology including 5G. This leads to an increase in the number of cloud services shared between multiple services (applications).

Accordingly, diversified clients may require different quality levels for a shared service (App-A). For example, among edge services, a service sensitive to a response time (latency) may be present, but the main object thereof may be merely calling and completing a service.

However, as described above with reference to FIG. 1, currently provided autoscaling of a cloud service merely provides the same service quality by generating a service instance to which the existing execution environment is copied without change based on the load imposed by requests for service (App-A).

Accordingly, what is required is technology for supporting efficient use of resources while responding to a service load by autoscaling a service such that different levels of quality (latency) are provided to multiple clients.

Accordingly, an embodiment proposes technology for autoscaling a service for balancing the load of a cloud system by scaling the service requested from the cloud system by multiple clients based on set scaling information.

That is, with regard to autoscaling of a first service shared between multiple clients, an embodiment proposes technology for scaling a service by additionally generating or deleting a second service that performs the same function as the first service but allows the execution type thereof to be selected from among an application type and a function type.

In the present invention, an original service and an additionally generated service are referred to as a first service and a second service, respectively, so as to be differentiated from each other for convenience of description, but the first service and the second service perform the same function, and it is obvious that they can appear to clients to be the same service. Also, the first service may be a single original service, and the second service may be additionally generated multiple services.

Figure 2:
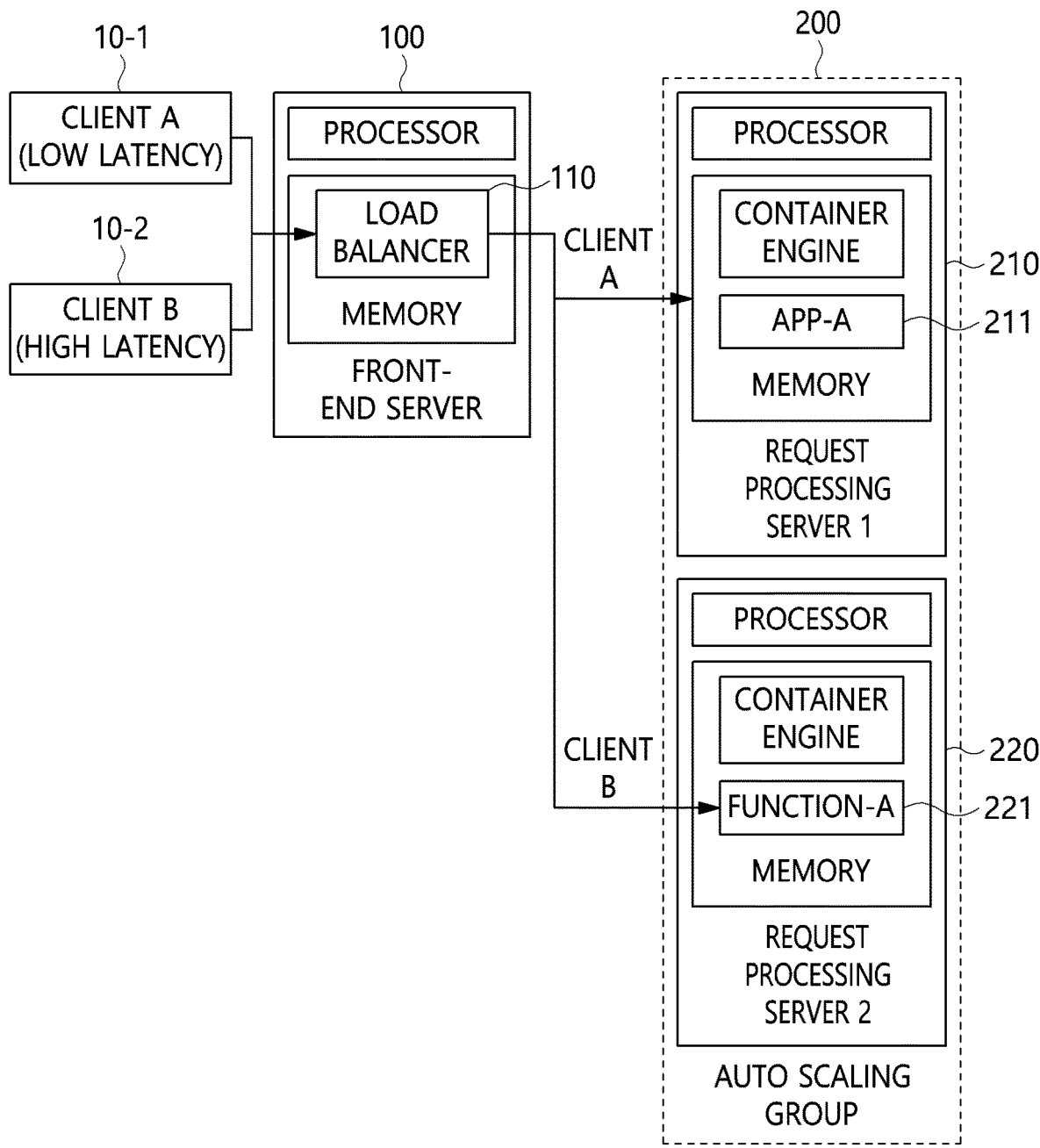
FIG. 2 is an exemplary view illustrating autoscaling of a service shared in a cloud according to an embodiment.

FIG. 2 is an exemplary view illustrating autoscaling of a service shared in a cloud according to an embodiment.

Referring to FIG. 2, multiple clients 10-1 and 10-2 may be various applications executed inside or outside the cloud.

Here, the multiple clients 10-1 and 10-2 may call App-A 211, which is a first service shared in the cloud.

According to an embodiment, as the load is increased with the respective calls to App-A 211 by the multiple clients 10-1 and 10-2, at least one second service for performing the same function as App-A 211 may be additionally generated.

For example, referring to FIG. 2, a new second service instance 220 in which Function-A 221, which is the second service, can be run may be additionally generated.

Here, the execution type of the second service instance 220 may be different from that of the first service instance 210, in which App-A 211 is run.

That is, when a large number of clients does not mind low quality (that is, a long response time) of App-A 211, Function-A 221 of a function type, rather than an application type like App-A 211, may be additionally generated.

Accordingly, a load balancer 110 may deliver a call from a client (client A 10-1) that requires low latency to the App-A instance (request-processing server 1) 210, which is the first service instance, but may deliver a call from a client (client B 10-2) that does not require low latency to the Function-A instance (request-processing server 2) 220, which is the second service instance.

Figure 3:
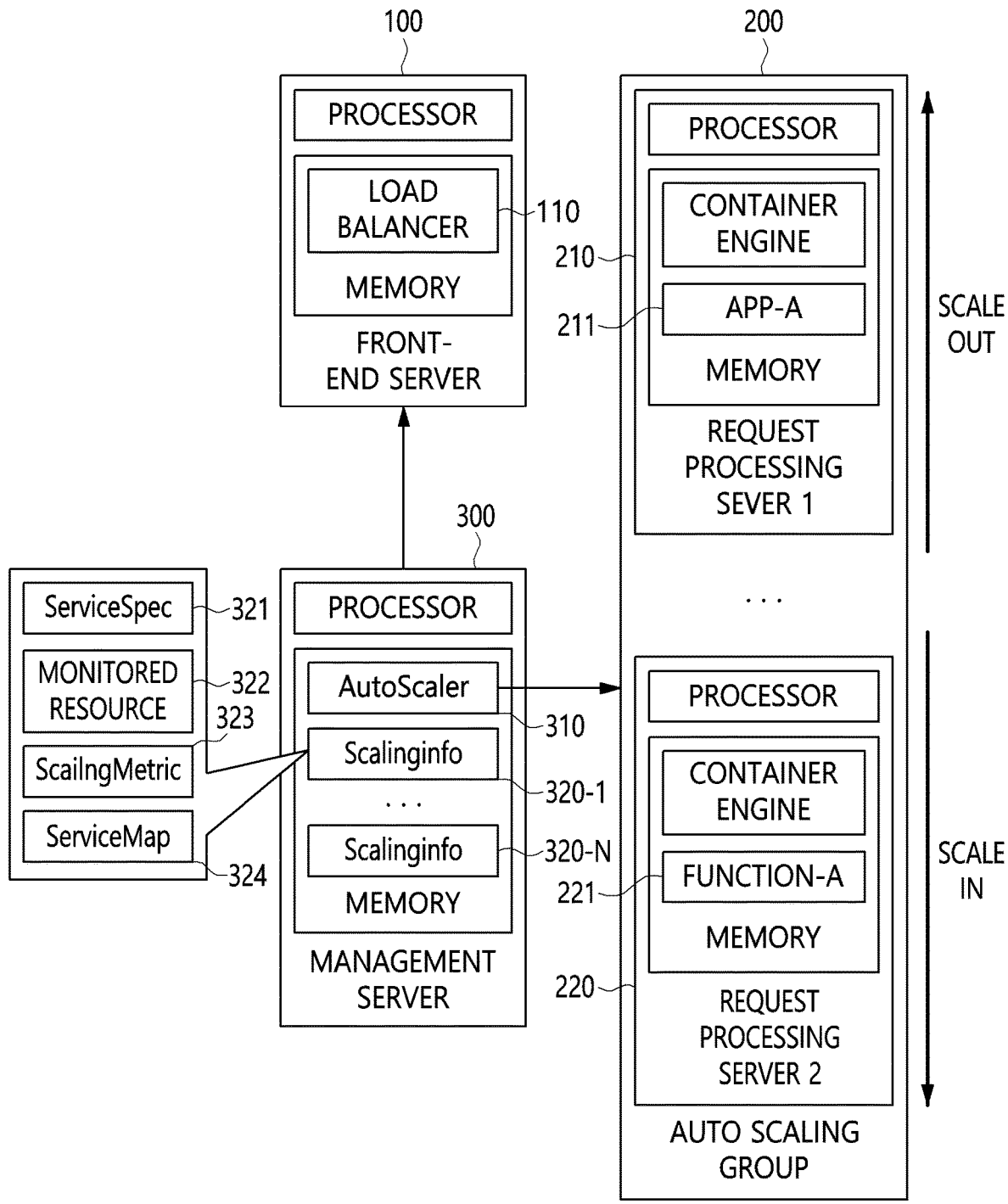
FIG. 3 is a block diagram of a system including an apparatus for autoscaling a service shared in a cloud according to an embodiment.

FIG. 3 is a block diagram of a system including an apparatus for autoscaling a service shared in a cloud according to an embodiment.

Referring to FIG. 3, the apparatus for autoscaling a service shared in a cloud according to an embodiment is implemented in the form of a management server 300.

Here, the management server 300 may include memory in which at least one program is recorded and a processor for executing the program.

Here, the program may balance the load of a cloud system by scaling the service requested from the cloud system by multiple clients based on set scaling information.

Here, an autoscaler 310, which is a program executed by the processor, performs autoscaling of a shared service based on scaling information (ScalingInfo) 320-1, . . . , 320-N.

Here, the autoscaler 310 may be assigned to each service, thereby supporting scaling based on the scaling information (or autoscaling information) 320-1, . . . , 320-N. Alternatively, the autoscaler 310 may scale multiple services based on a list of pieces of autoscaling information.

Here, the autoscaler 310 may perform autoscaling by which at least one second service for performing the same function as the first service is additionally generated or deleted depending on the load that is incurred when the multiple clients call the first service in the cloud.

Here, at least one second service may be set to one of two or more execution types having different response times depending on the response time required by each of the multiple clients.

Here, the execution type of the second service may include an application type having the same response time (latency) as the first service and a function type having higher latency than the first service.

For example, FIG. 3 shows that the second service 221, the execution type of which is set to a function type, which has higher latency than the first service 211, is generated.

When it determines that scaling out of the service is required, the autoscaler 310 may additionally generate a second service instance of a function type or an application type, which is selected depending on whether the number of clients capable of tolerating latency higher than the latency of the first service is equal to or greater than a value acquired by dividing the total number of clients by the total number of service instances generated previously.

That is, information about the latency required by clients calling the first service is checked, and the type of the second type is selected based on the result of the determination as to whether the number of clients capable of tolerating high latency is equal to or greater than the average numbers of clients of the service instances that are currently running.

The autoscaler 310 registers execution information, pertaining to the additionally generated or deleted second service, and client information, including required latency, in the load balancer 110.

Accordingly, the load balancer 110 may deliver a request from a client for which it is determined that the latency required thereby is higher than the latency of the first service 211 to the function-type second service 221. Here, the load balancer 110 compares the IP address information of the client with the client information received from the autoscaler 310, and may decide on the type of service to which a call is to be delivered.

Meanwhile, each of the pieces of scaling information 320-1, . . . , 320-N may include service information (ServiceSpec) 321, monitored resource information (MonitoredResource) 322, scaling metrics (ScalingMetric) 323, and service map information (ServiceMap) 324.

Table 1 is an example of the service information (ServiceSpec) 321.

TABLE 1

| ServiceName | Type | ContainerSpec | autoscaling | Latency (ms) | . . . |
|---|---|---|---|---|---|
| A | App | CS-A | Yes | 20 | |
| A | Func | CS-FuncA | No | 25 | |

Referring to Table 1, the service information (ServiceSpec) may include a service name (ServiceName), an execution type (Type), a processor required for execution (a CPU, a GPU, or the like), container specifications (ContainerSpec) including settings information of resources, such as memory and the like, information about whether autoscaling is set (autoscaling), and quality information including the response time (latency) of the service (Latency). This service information may be used to manage information about a second service that provides the same function based on an application (App) or a function (Func), which is the execution type of the service.

Table 2 is an example of the scaling metrics (ScalingMetric) 323.

TABLE 2

| ServiceName | ScalingMetric | ... |
|---|---|---|
| A | SM-A | |

Here, scaling metrics may include the utilization of resources, such as a CPU, memory and the like, a user-defined metric, and a function-execution-type service metric. The user-defined metric is set by a user in order to use the same as conditions for scaling when the user develops a service, and the function-execution-type service metric may be used to determine a target when a service is scaled in. The scaling metrics will be described in detail later with reference to Table 5 below.

For a comparison with the values set in the scaling metrics (ScalingMetric), resources may be monitored during execution of the service, and the result thereof may be provided to the autoscaler 310.

Table 3 is an example of the monitored resource information (MonitoredResource) 322.

TABLE 3

| InstanceName | ServiceName | Type | CPU(%) | Mem(%) | Requests | customMetric |
|---|---|---|---|---|---|---|
| A-1002030013240 | A | App | 70 | 80 | | |
| A-Func | A | Func | | | 100 | |

Referring to Table 3, the resource information may include information about the amount of hardware usage.

Meanwhile, the autoscaler 310 may use the service map information (ServiceMap) in order to provide hints on distribution of service requests to the load balancer after service scaling.

Table 4 is an example of the service map (ServiceMap) 324.

TABLE 4

| ClientName | IP | CalledServiceType | Latency | ... |
|---|---|---|---|---|
| Client1 | 129.254.x.x | App | high | ... |
| Client2 | 10.10.x.x | App | low | ... |
| Cleint3 | 10.10.x.x | Func | high | ... |

Referring to Table 4, the service map includes information about a client that calls a service. The client information may include IP address information pertaining to any one of clients, latency information including information about the type of latency, and the type of the service to which the load balancer is to forward a request (CalledServiceType).

For example, when the latency of the service called by a client is allowed to be higher than the latency specified in the service information (ServiceSpec), the value of the latency may be specified as 'high' in the service map, whereas when the latency of the service must be equal to or lower than the latency specified in the service information (ServiceSpec), the value of the latency may be specified as 'low' in the service map.

Accordingly, when the autoscaler 310 newly generates a function-type second service, the load balancer 110 may deliver IP address information of clients capable of tolerating high latency to the load balancer 110 such that the load balancer 110 delivers requests from these clients to the function-type second service.

Table 5 is an example of scaling metrics (ScalingMetric).

TABLE 5

ScalingMetric:
  scaleTarget:
    name:App-A
  maxReplicas: 5
  minReplicas: 1
  includeFuncReplica: 1
    name: Func-A
  metrics:
    -type: Resource
      name; cpu
      avgUtilization: 70%
      maxUtilization: 90%
      minUtilization: 40%
    -type:Custom
      name:avgQuery
      max:120
      min:30
      avg:50
    -type:Func
      name:minRequest
      avg:50

Referring to Table 5, the scaling metric may define information about a service and metrics. First, the scaling metric may include a target service name, the maximum value for the number of service instances (maxReplicas), the minimum value therefor (minReplicas), and information about whether to include a function-type replicated service. Also, when a function-type replicated service is included, the function-type service name may be defined therein.

The metrics for scaling may include resource metrics (type: Resource) or user-defined metrics (type: Custom), and function metrics (type: Func) may be additionally set only when a function-type replicated service is included. Also, the maximum value (maxUtilization), the minimum value (minUtilization), and the average value (avgUtilization) for the average utilization of container resources allocated for execution of an application-type service may be defined.

Meanwhile, the autoscaler 310 may determine whether to scale out the service depending on whether the monitored resource value of the first service is equal to or greater than the maximum value set in the scaling metric information.

That is, the autoscaler 310 may add or stop a service instance in order to make the monitored resource utilization of the service approach the average utilization set in the scaling metrics. When the monitored resource utilization is greater than the maximum value, a service instance is added (generated), whereas when the monitored resource utilization is less than the minimum value, the service instance may be stopped.

Also, when multiple service instances are running, the autoscaler 310 may calculate the average of the monitored values from the instances and compare the same with the values defined in the scaling metrics.

Here, the user-defined metrics are applied in the same manner as the resource metrics.

Meanwhile, the function metrics are not applied when the service is scaled out, and minRequest may be set therein so as to be used to select the service instance to be stopped when the service is scaled in.

Here, minRequest indicates the number of calls to the function-type service in a specific time period.

Figure 4:
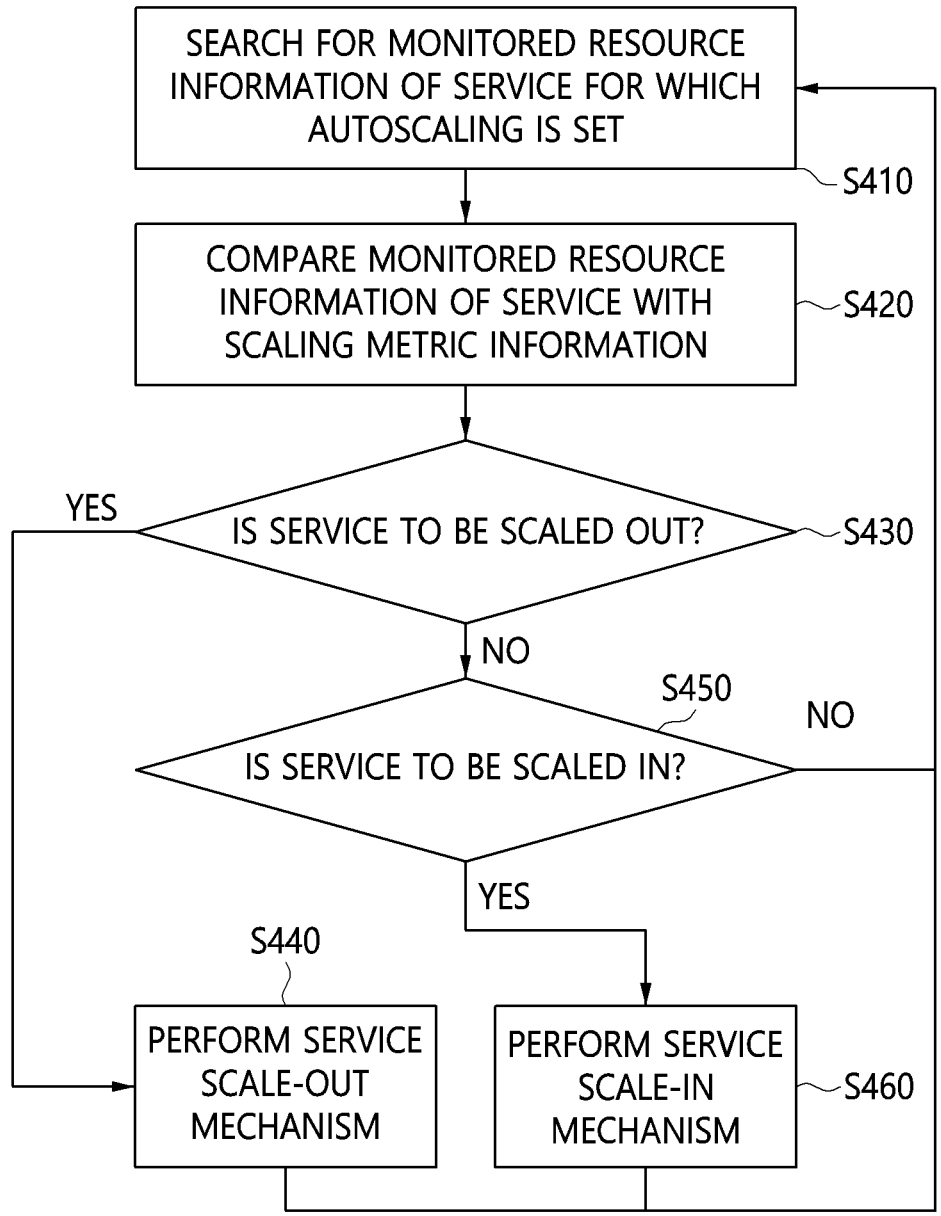
FIG. 4 is a flowchart for explaining a method for autoscaling a service shared in a cloud according to an embodiment.

FIG. 4 is a flowchart for explaining a method for autoscaling a service shared in a cloud according to an embodiment.

Referring to FIG. 4, the autoscaler 310 searches for the monitored resource information of a first service for which autoscaling is set at step S410 and compares the same with scaling metric information of the first service at step S420.

The autoscaler 310 determines at step S430 whether to scale out the service depending on whether the monitored resource value of the first service is equal to or greater than the maximum value set in the scaling metric information.

When it determines to scale out the service at step S430, the autoscaler 310 executes a service scale-out mechanism at step S440. The service scale-out mechanism will be described in detail later with reference to FIG. 5.

Conversely, when it determines not to scale out the service at step S430, the autoscaler 310 determines at step S450 whether to scale in the service depending on whether the monitored resource value of the first service is equal to or less than the minimum value set in the scaling metric information.

When it determines to scale in the service at step S450, the autoscaler 310 executes a service scale-in mechanism at step S460. The service scale-in mechanism will be described in detail later with reference to FIG. 6.

Conversely, when it determines not to scale in the service at step S450, the autoscaler 310 goes to step S410, thereby determining whether to scale the first service again in the next period.

Figure 5:
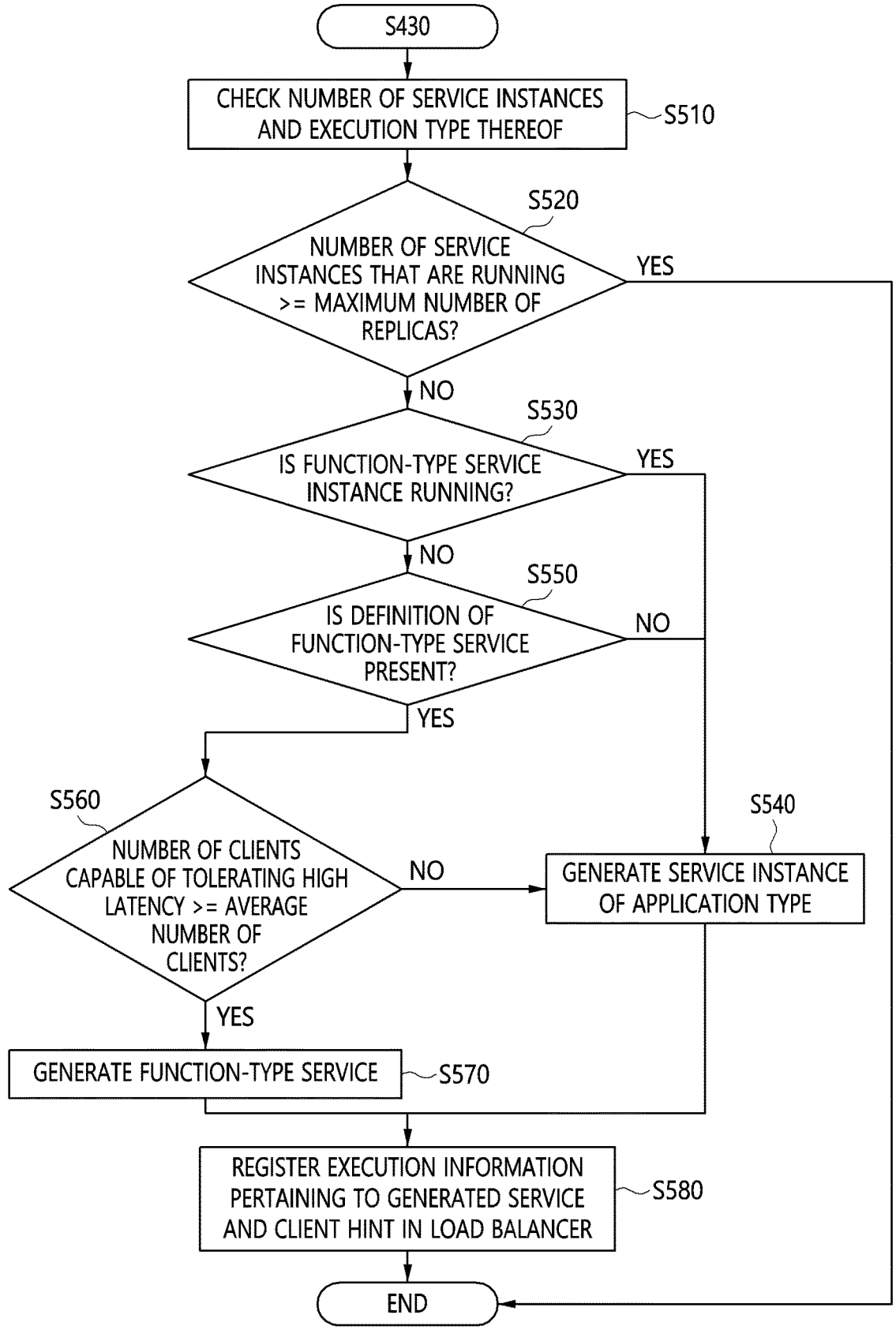
FIG. 5 is a flowchart for explaining a step of scaling out a service according to an embodiment.

FIG. 5 is a flowchart for explaining the step of scaling out a service according to an embodiment.

Referring to FIG. 5, the autoscaler 310 checks the number of second service instances and the execution type of each of the second service instances based on monitored resource values at step S510.

Here, monitored resource information includes the monitored values of resources specified in scaling metrics (ScalingMetric) for each service instance, and includes information about the number of service requests when the service is a function type.

Here, a function-type service is regarded as a single service instance, and the number of application-type containers is counted, whereby the total number of service instances may be calculated.

The autoscaler 310 checks at step S520 whether the number of second service instances checked thereby is equal to or greater than the maximum number of replicas (maxReplicas) defined in the scaling metrics (ScalingMetric).

When it is determined at step S520 that the number of second service instances that are running is equal to or greater than the maximum number of replicas, the autoscaler 310 terminates scaling without additional generation of a second service instance.

Conversely, when it is determined at step S520 that the number of second service instances that are running is less than the maximum number of replicas, the autoscaler 310 checks at step S530 whether a second service instance of a function type is registered.

When it is determined at step S530 that a second service instance of a function type is registered, the autoscaler 310 generates a second service instance of an application type at step S540.

Conversely, when it is determined at step S530 that a second service instance of a function type is not registered, the autoscaler 310 checks whether a function-type service definition of the first service is present at step S550.

When it is determined at step S550 that a function-type service definition of the first service is not present, the autoscaler 310 generates a second service instance of an application type at step S540.

Conversely, when it is determined at step S550 that a function-type service definition of the first service is present, the autoscaler 310 determines at step S560 whether the number of clients for which it is determined that the latency required thereby is higher than the latency of the first service is equal to or greater than the average number of clients of each service instance.

Here, the autoscaler 310 searches a service map (ServiceMap) and checks whether the number of clients capable of tolerating a long response time, that is, high latency, is equal to or greater than a value acquired by dividing the total number of clients by the total number of service clients generated previously.

When it is determined at step S560 that the number of clients for which it is determined that the latency required thereby is higher than the latency of the first service is equal to or greater than the average number of clients for each service instance, a second service instance of a function type is generated at step S560.

Conversely, when it is determined at step S560 that the number of clients for which it is determined that the latency required thereby is higher than the latency of the first service is less than the average number of clients for each service instance, a second service instance of an application type is generated at step S540.

Finally, the autoscaler 310 registers information about execution of the application-type or function-type second service, which performs the same function as the first service, and client hints, including required latency, in the load balancer at step S580.

Figure 6:
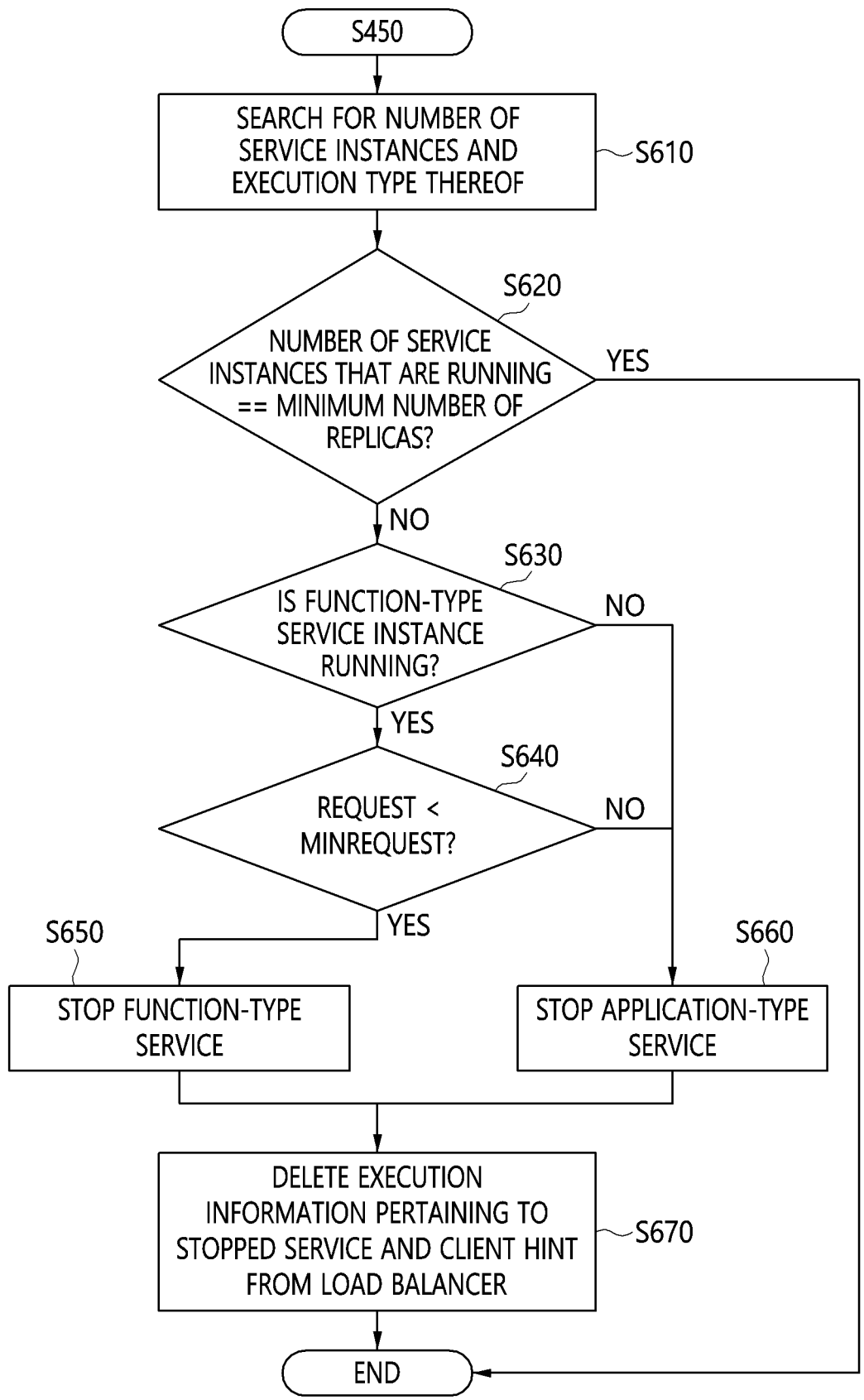
FIG. 6 is a flowchart for explaining a step of scaling in a service according to an embodiment.

FIG. 6 is a flowchart for explaining the step of scaling in of a service according to an embodiment.

Referring to FIG. 6, the autoscaler 310 searches for the number of second service instances and the execution type of each of the second service instances based on monitored resource values at step S610.

Then, the autoscaler 310 checks whether the number of second service instances that are running is equal to the minimum number of replicas (minReplicas) defined in the scaling metrics (ScalingMetric) at step S620.

When it is determined at step S620 that the number of second service instances that are running is equal to the minimum number of replicas, the autoscaler 310 terminates scaling without deleting a second service instance.

Conversely, when it is determined at step S620 that the number of second service instances that are running is greater than the minimum number of replicas defined in the scaling metrics, the autoscaler 310 determines at step S630 whether a second service instance of a function type is running.

When it is determined at step S630 that a second service instance of a function type is running, the autoscaler 310 checks at step S640 whether the number of requests for the function-type second service is less than the minimum number of requests for a function type (minRequest) defined in the scaling metrics.

When it is determined at step S640 that the number of requests for the function-type second service is less than the minimum number of requests for a function type (minRequest) defined in the scaling metrics, the autoscaler 310 stops the second service instance of the function type at step S650.

Conversely, when it is determined at step S630 that no second service instance of the function type is running or when it is determined at step S640 that the number of requests for the function-type second service is equal to or greater than the minimum number of requests for a function type (minRequest) defined in the scaling metrics, the autoscaler 310 stops the second service instance of the application type at step S660.

Here, one or more second service instances may be stopped, and the autoscaler 310 may calculate the number of second service instances to be stopped using any of various algorithms based on the monitored resource values and average resource values specified in the scaling metrics.

Finally, the autoscaler 310 may delete information about execution of the application-type or function-type second service, which performs the same function as the first service, and a client hint, including required latency, from the load balancer at step S670.

Figure 7:
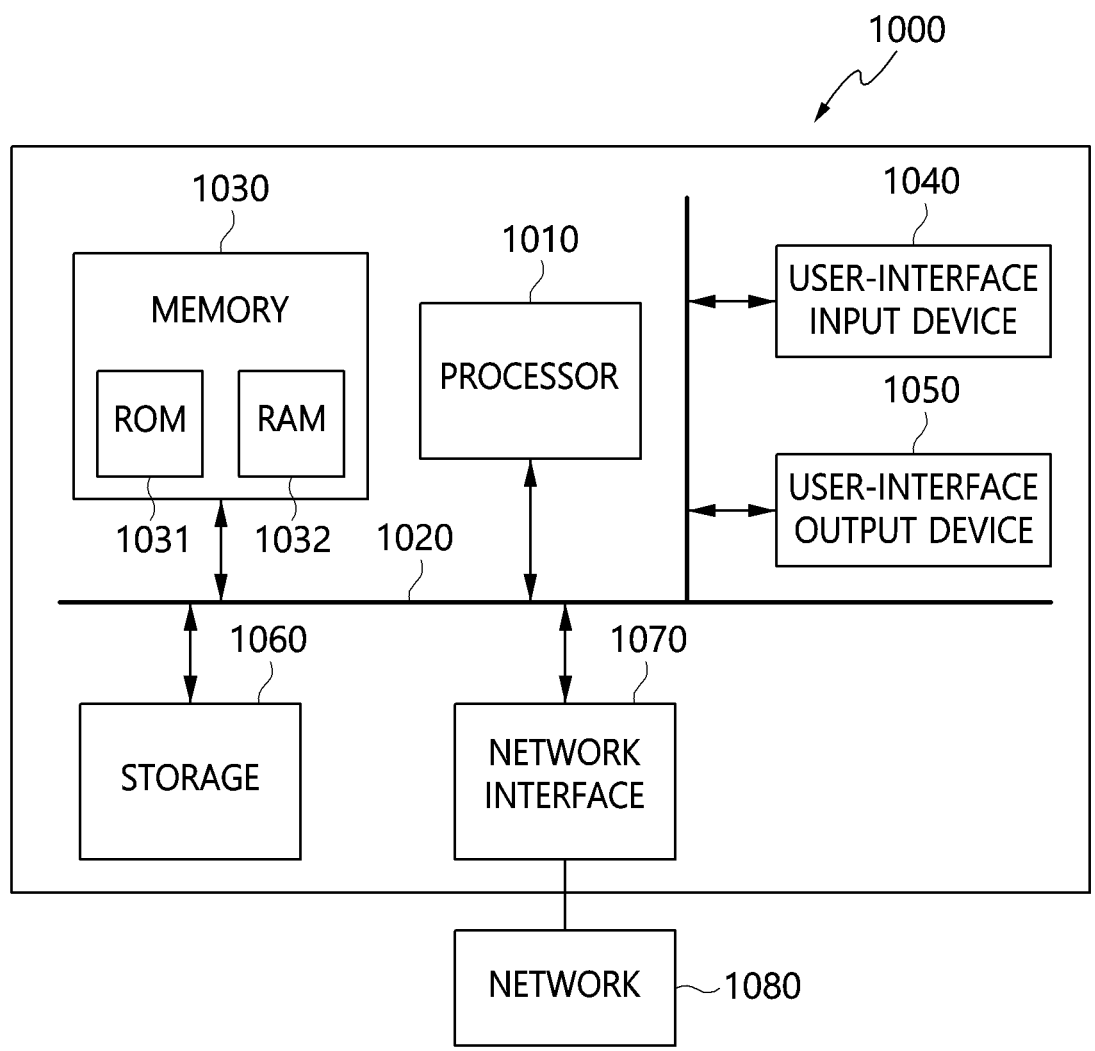
FIG. 7 is a view illustrating a computer system configuration according to an embodiment.

FIG. 7 is a view illustrating a computer system configuration according to an embodiment.

Each of the apparatus for autoscaling a service shared in a cloud and a load balancer device according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected with a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, and an information delivery medium. For example, the memory 1030 may include ROM 1031 or RAM 1032.

According to an embodiment, when multiple clients have different requirements with regard to the response time (latency) of a shared service, service scaling for balancing the load of the shared service may be supported using an application type (an existing SaaS form) and a function type (FaaS) together.

Through service scale-out and scale-in that allow different execution types, all of the requirements of the clients with regard to response time may be satisfied, and resources may be used more efficiently.

Although embodiments of the present invention have been described with reference to the accompanying drawings, those skilled in the art will appreciate that the present invention may be practiced in other specific forms without changing the technical spirit or essential features of the present invention. Therefore, the embodiments described above are illustrative in all aspects and should not be understood as limiting the present invention.

What is claimed is:

1. An apparatus for autoscaling a service, comprising:
memory in which at least one program is recorded; and
a processor for executing the program,
wherein:
the program performs autoscaling by which at least one second service for performing a same function as a first service is additionally generated or deleted depending on a load incurred when multiple clients call the first service in the cloud, and
the at least one second service is set to one of two or more execution types having different response times depending on a response time required by each of the multiple clients,
wherein an execution type of the second service includes an application type having a same response time as the first service and a function type having a response time longer than a response time of the first service,
wherein:
the program registers information about execution of the additionally generated or deleted second service and client information, including the required response time, in a load balancer, and
the load balancer delivers a request from a first client among the multiple clients for which it is determined that a response time required is longer than the response time of the first service to the second service of the function type,
wherein:
the first service is executed in a first service instance based on a first container,
the second service is executed in a second service instance based on a second container, and
when the execution type of the second service is the function type, container configuration information of the first service instance is different from container configuration information of the second service instance,
wherein:
the program performs service scale-out depending on whether a monitored resource value of the first service is equal to or greater than a maximum value set in scaling metric information, and
performs additionally generating a second service instance of a function type or an application type depending on whether a number of clients for which it is determined that a response time required is longer than the response time of the first service is equal to or greater than a value acquired by dividing a total number of clients by a total number of service instances generated previously.

2. The apparatus of claim 1, wherein:
the program further performs checking a number of second service instances and an execution type of each of the second service instances based on monitored resource values of the second resource instances; and
checking whether the number of second service instances is equal to or greater than a maximum number of replicas defined in the scaling metric information, and
additionally generating the second service instance is performed only when the number of second service instances is less than the maximum number of replicas defined in the scaling metric information.

3. The apparatus of claim 1, wherein:
the program further performs determining whether the second service instance of the function type is running, and additionally generating the second service instance is configured to additionally generate the second service instance of the application type when the second service instance of the function type is running.

4. The apparatus of claim 1, wherein:
the program further performs determining whether a definition of the second service of the function type is present, and
additionally generating the second service instance is configured to generate the second service instance of the application type when the definition of the second service of the function type is not present.

5. The apparatus of claim 1, wherein:
the program performs service scale-in depending on whether the monitored resource value of the first service is equal to or less than a minimum value set in the scaling metric information, and performs, depending on whether a number of requests for the second service of the function type is equal to or greater than a minimum number of requests for the function type defined in the scaling metric information, stopping a second service instance of a function type or application type that is running.

6. The apparatus of claim 5, wherein:
the program further performs checking a number of second service instances and an execution type of each of the second service instances based on monitored resource values of the second resource instances; and checking whether the number of second service instances is equal to a minimum number of replicas defined in the scaling metric information, and
stopping the second service instance is performed only when the number of second service instances is greater than the minimum number of replicas defined in the scaling metric information.

7. The apparatus of claim 5, wherein:
the program further performs determining whether the second service instance of the function type is running, and
stopping the second service instance of the function type is configured to stop the second service instance of the application type when the second service instance of the function type is not running.

\* \* \* \* \*